(12) United States Patent
King et al.

(10) Patent No.: US 7,851,558 B2
(45) Date of Patent: Dec. 14, 2010

(54) BROMINATED BUTADIENE/VINYL AROMATIC COPOLYMERS, BLENDS OF SUCH COPOLYMERS WITH A VINYL AROMATIC POLYMER AND POLYMERIC FOAMS FORMED FROM SUCH BLENDS

(75) Inventors: Bruce A. King, Midland, MI (US);
William G. Stobby, Midland, MI (US);
Daniel J. Murray, Midland, MI (US);
Anteneh Z. Worku, Midland, MI (US);
Inken Beulich, Buehl Bw (DE); Sheila M. Tinetti, Vernon Hils, IL (US);
Stephen F. Hahn, Midland, MI (US);
Ray E. Drumright, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 417 days.

(21) Appl. No.: 12/091,346

(22) PCT Filed: Oct. 23, 2006

(86) PCT No.: PCT/US2006/041295

§ 371 (c)(1),
(2), (4) Date: Apr. 24, 2008

(87) PCT Pub. No.: WO2007/058736

PCT Pub. Date: May 24, 2007

(65) Prior Publication Data

US 2008/0287559 A1    Nov. 20, 2008

Related U.S. Application Data

(60) Provisional application No. 60/735,361, filed on Nov. 12, 2005.

(51) Int. Cl.
*C08F 236/06* (2006.01)
*C08L 9/00* (2006.01)

(52) U.S. Cl. .................. 525/331.9; 525/241; 525/242; 525/332.1; 525/332.9; 525/333.3; 525/333.4; 525/355; 525/359.1; 525/359.2; 525/98; 525/86; 525/221; 525/232; 524/515; 526/335

(58) Field of Classification Search .................. 525/86, 525/96, 221, 232, 241, 242, 332.1, 332.9, 525/331.9, 333.3, 333.4, 355, 359.1, 259.2; 524/515; 526/335
See application file for complete search history.

(56) References Cited

U.S. PATENT DOCUMENTS

| | | | |
|---|---|---|---|
| 3,639,304 A | 2/1972 | Raley | |
| 3,640,941 A | 2/1972 | Findley et al. | |
| 3,652,494 A | 3/1972 | Baker | |
| 3,652,678 A | 3/1972 | George et al. | |
| 3,668,155 A | 6/1972 | Raley | |
| 3,975,327 A | 8/1976 | Nintz et al. | |
| 5,532,322 A | 7/1996 | Kadono | |

FOREIGN PATENT DOCUMENTS

| DE | 1075103 | | 2/1960 |
|---|---|---|---|
| DE | 1301497 | B | 8/1969 |
| DE | 137308 | A3 | 8/1979 |
| EP | 0566955 | B1 | 4/1993 |
| FR | 1506872 | | 12/1967 |
| GB | 1166290 | A | 12/1966 |
| GB | 1229124 | | 5/1969 |
| GB | 1474536 | | 8/1977 |
| JP | 55131002 | A | 10/1980 |
| JP | 57111337 | A | 7/1982 |
| WO | WO2005/095501 | A | 10/2005 |

OTHER PUBLICATIONS

G. Dall' Asata et al. *Die Makromolekulare Chemie*, 154, 279-290 (1972).
Kawaguchi et al., *Polymer*, 26, 1257-1264 (1985).
Ceausescu et al., *J. Macromolecular Science-Chemistry*, A22 (5-7), 803-818 (1985).
*Advanced Organic Chemistry* (March, 2nd Edition, 1977), p. 740-741.
*Journal of Organic Chemistry*, 28, 3256-3258 (1963).
*Chem. Letters*, p. 627-630 (1987).
*Tetrahedron*, 50, p. 6433-6440 (1994).
*Journal of the American Chemical Society* (JACS), 73, p. 4525-4528 (1951).
*Journal of Organic Chemistry*, 57, p. 2740 (1992).
*Tet Letters*, 35, 7429-7432 (1994).
Halasa, *Polymer*, vol. 46, p. 4166-4174 (2005).
A. F. Halasa, *Journal of Polymer Science* (Polymer Chemistry Edition), vol. 14, p. 497-506(1976).
Henry L. Hsieh, et al., *Anionic Polymerization Principles and Practical Applications*, Chapter 9, Mercel Dekker, Inc., New York, 1996.
J. F. Henderson, et al., *Journal of Polymer Science*, D, Macromolecular Review, vol. 3, p. 317-375 (1968).
Y. Tanaka, et al., *J. Polym. Sci.* A-2, 9, 43-57 (1971).
J. Zymona, et al., *Macromolecules*, 6, 129-133 (1973).
H. Ashataka, et al., *J. Polym. Sci., Polym. Chem.*, 21, 1853-1860 (1983).
Henry L. Hsieh, et al., *Anionic Polymerization Principles and Practical Applications*, Chapter 15, Mercel Dekker, Inc., New York, 1996.
Henry L. Hsieh, et al., *Anionic Polymerization Principles and Practical Applications*, Chapter 14, p. 372, Mercel Dekker, Inc., New York, 1996.
*Journal of Applied Polymer Seicnce*, vol. 8, (1964), p. 2485-2495.
Grafton D. Chase, et al., *Principles of Radioisotope Methodology*, Chapter 12, Section 12.5, pp. 427-432, Burgess Publishing Company (1967).
Buzdugan, E. et al., *Bromination of Some Styrene-diene Block Copolymers*, European Polymer Journal, 33 (10-12) 1713-1716, Coden, (1997).
Buzdugan, E. et al., *Mechanical Properties of Some Brominated Styrene-Diene Block Copolymers*, p. 1531-1537, Elsevier Science Ltd. Great Britain. (1998).

*Primary Examiner*—Irina S Zemel
(74) *Attorney, Agent, or Firm*—Steven W. Mork

(57) ABSTRACT

A thermally stable brominated butadiene copolymer, such as brominated styrene/butadiene block copolymer, brominated random styrene/butadiene copolymer or brominated styrene/butadiene graft copolymer, preparation of the brominated butadiene copolymers, use of the brominated butadiene copolymers as a flame retardant additive and polymeric compositions, both foamed and non-foamed, that incorporate a flame-retarding amount of brominated butadiene copolymer.

25 Claims, No Drawings

BROMINATED BUTADIENE/VINYL AROMATIC COPOLYMERS, BLENDS OF SUCH COPOLYMERS WITH A VINYL AROMATIC POLYMER AND POLYMERIC FOAMS FORMED FROM SUCH BLENDS

This application claims benefit of U.S. Provisional Application 60/735,361, filed 12 Nov. 2005.

The present invention relates generally to a thermally stable brominated butadiene copolymer, such as a brominated styrene/butadiene block copolymer (Br-SBC), brominated random styrene/butadiene copolymer (Br-r-SB) or brominated styrene/butadiene graft copolymer (Br-g-SB), a process for preparing brominated butadiene copolymers, use of brominated butadiene copolymers as a flame retardant additive and polymeric compositions, both foamed and non-foamed, that incorporate a flame-retarding amount of brominated butadiene copolymer.

Hexabromocyclododecane (HBCD), a commonly used flame retardant (FR) additive, has been the subject of various academic studies and regulatory risk assessment processes. Many of the studies and assessments focus on a possibility that HBCD may be one or more of bioaccumulative, toxic to aquatic organisms, and/or environmentally persistent, leading to a possible need for programs and regulations to reduce the risk of environmental effects. The possibility of such programs and/or regulations provides an incentive to find a replacement for HBCD.

Potentially practical FR additives must possess sufficient thermal stability to undergo very little, preferably no, thermal degradation when subjected to melt blending, injection molding and extrusion foaming process conditions (and other processes involving polymer melts) where temperatures can exceed 200 degrees centigrade (° C.), sometimes reaching as high as 230° C. In addition to thermal stability, FR additives must possess other key characteristics including compatibility with polymers being foamed and foaming agents used in foaming, and lack of adverse affects upon foam cell formation and foam cell size. Desirable FR additives have an ability to increase Limiting Oxygen Index (LOI) values of melt-fabricated articles, such as foams, fibers, films, sheets and pipes, thereby enabling such articles to pass standard fire tests. For example, incorporating HBCD into a formulation that yields extruded polystyrene (XPS) foam increases foam LOI from 19 in the absence of HBCD to more than (>) 25. A LOI>25 enables XPS foam articles to pass standard fire tests, such as Underwriters Laboratory (UL) 723 and European Norm (EN) Fire Test # ISO 11925-2 Class E.

A number of open literature articles mention synthesis of brominated polybutadiene homopolymer (Br-PBD). The articles disclose use of elemental bromine as a brominating agent to prepare Br-PBD, but do not discuss thermal stability of the resulting Br-PBD. Br-PBD prepared using elemental bromine appears to lack sufficient thermal stability under typical melt processing conditions to make it useful as a substitute for HBCD. The lack of sufficient thermal stability may stem, at least in part, from formation of tertiary bromides via a free radical mechanism or process. When placed in solution in chloroform, such Br-PBDs appear to lose or release bromine, hydrobromic acid (HBr) or both as evidenced by a color change of the solution from clear to red.

French patent FR 1506872 describes the synthesis of a brominated homopolymer of polybutadiene in which the polybutadiene has a preferred degree of polymerization (Dp) from 5 to 200 with a most preferred Dp from 10 to 50 and with greater than (>) 50 percent (%) 1,2-groups. Bromination is performed using elemental bromine with carbon tetrachloride and butyl alcohol as a solvent mixture. German patent DD 137308 describes the bromination of "low viscosity" (3000 to 4000 centipoises (Cp)) polybutadiene homopolymer using elemental bromine with carbon tetrachloride and methanol or ethanol as a reaction mixture. Great Britain patent GB 1166290 does not teach any bromination methodologies, but does claim a thermoplastic composition with at least 0.1 percent by weight (wt %) bromine, a styrene polymer and a brominated diene polymer (butadiene and/or isoprene) which has at least 50 wt % of its base units as 1,2 linkages and a Dp of 10 to 2000 preferably 20 to 1100. However, thermal stability is determined by molding plaques containing 4 wt % bromine (polystyrene basis) and heating for eight hours at 100° C. The samples are then evaluated qualitatively by discoloration.

U.S. Pat. No. 3,975,327 discloses particulate, expandable styrene polymers comprising, in part, flame retardants such as brominated oligomers of butadiene or isoprene.

U.S. Pat. No. 3,640,941 discloses adhesive compositions comprising, in part, a graft polymer synthesized by combining solid polybutadiene (PBD) or halogenated PBD with substituted cyclopentadiene in a specific molar ratio. '941 teaches that PBD may be halogenated by bubbling gaseous halogen, such as bromine, through a heated solution containing PBD or by reacting PBD with a halogen-bearing material such as N-halosuccinimide.

Japanese Patent (JP) 55131002A discloses partially brominated isotactic 1,2-polybutadiene, an elastomeric material that can be processed like a thermoplastic material. The material has a 1,2-isomer content in excess of 75%, based on total butadiene isomer content and an estimated bromine content of from 5 to 40 percent by weight (wt %), based upon brominated polymer weight and an estimated maximum of one-half of the double bonds being brominated.

JP 57111332 discloses a foamable polystyrene resin composition containing a flame retardant prepared by brominating random styrene-butadiene copolymer rubber (SBR). The SBR materials are referred to as liquid SBR, suggesting that the SBR materials have a low molecular weight relative to solid SBR materials. JP '372 reveals no information about SBR 1,2-isomer content, but does teach a bromine content of 50 to 80 wt %, based upon brominated SBR weight.

A first aspect of the present invention is a thermally stable brominated copolymer, the copolymer having polymerized therein a butadiene moiety and a vinyl aromatic monomer moiety, the copolymer having, prior to bromination, a vinyl aromatic monomer content of from 5 to 90 percent by weight, based upon copolymer weight, a 1,2-butadiene isomer content of greater than 0 percent by weight, based upon butadiene moiety weight, and a weight average molecular weight of at least 1000. The brominated copolymer has an unbrominated, non-aromatic double bond content of less than 50 percent, based upon non-aromatic double bond content of the copolymer prior to bromination as determined by $^1$H NMR spectroscopy (that is, greater than 50% of the butadiene repeat units are brominated) and a five percent weight loss temperature (5% WLT), as determined by thermogravimetric analysis (TGA) of at least 200 degrees centigrade (° C.). The unbrominated, non-aromatic double bond content is preferably less than or equal to 15 percent, even more preferably less than 10 percent, in each instance based upon non-aromatic double bond content of the copolymer prior to bromination, that is, the proportion of butadiene repeat units that are brominated is preferably at least 85% and more preferably at least 90%. The brominated copolymer may be used in any application where HBCD is currently used.

A second aspect of the present invention is a polymer blend, the blend comprising a vinyl aromatic polymer and a flame-retarding amount of the brominated copolymer of the first aspect. The blend may be used to make coating compositions, a molded article, either filled or unfilled with a conventional filler material, (for example extruded (for example, fiber, film, sheet, pipe, profiles), molded, injection molded, blow molded, injection-blow molded (for example expanded parison)) or, when combined with a foaming agent (physical and/or chemical blowing agents conventionally used to make extruded foams or expanded bead foam articles of manufacture), a foamed article or a void-containing molded article. The foamed article may be either an extruded foam article or an expanded foam bead article.

A third aspect of the present invention is process of preparing the brominated copolymer of the first aspect, the process comprising:

a. providing a homogeneous reaction solution of a copolymer, a brominating agent and a solvent, the copolymer having polymerized therein a butadiene moiety and a vinyl aromatic monomer moiety, the copolymer having a vinyl aromatic monomer content of from 5 to 90 percent by weight, based upon copolymer weight, a 1,2-butadiene isomer content of greater than 0 percent by weight, based upon butadiene moiety weight, and a weight average molecular weight of at least 1000;

b. maintaining the reaction solution under reaction conditions for a period of time sufficient to brominate more than 50 percent of non-aromatic double bonds contained in the copolymer, based upon non-aromatic double bond content of the copolymer prior to bromination as determined by $^1$H NMR spectroscopy. Recovery of the brominated copolymer occurs via conventional techniques such as those detailed below in the examples.

After attaining a desired level of bromination, particularly when using a tribromide such as a tetra-alkyl ammonium tribromide or pyridinium tribromide (PTB) as a brominating agent, preferred recovery procedures include removing byproduct tetra-alkyl ammonium monobromide or pyridinium hydrobromide (PHB) from the reaction solution by washing, decanting or filtration. Further removal of byproduct bromide salts may be accomplished by passing filtrate through silica gel or an ion exchange resin bed. As a preferred recovery step, the filtrate that exits the ion exchange resin bed can be washed with an amount of aqueous sodium hydrogen sulfite solution sufficient to neutralize or quench unreacted brominating agent (for example PTB) that may be present in the filtrate. This effectively removes or eliminates any orange color (possibly due to presence of unreacted PTB) that may be present in the filtrate before the aqueous sodium hydrogen sulfite solution wash. Brominated polymer is recovered by precipitation in a medium, such as methanol, in which the brominated polymer is substantially insoluble and preferably completely insoluble.

The brominating agent preferably comprises a tribromide selected from pyridinium tribromide, phenyltrimethylammonium tribromide and a tetra-alkylammonium tribromide such as tetrabutylammonium tribromide, more preferably pyridinium tribromide and most preferably a tetra-alkylammonium tribromide. The brominating agent optionally comprises a solvent for the tribromide. For example, chlorinated solvents, for example methylene chloride, serve as solvents for tetra-alkylammonium tribromides and tetrahydrofuran (THF) functions as a suitable solvent for PTB.

An alternative preferred brominating agent comprises a combination of elemental bromine and a solvent or solvent blend and may optionally include a monobrominated species, for example, a tetra-alkylammonium monobromide. An especially preferred alternative brominating agent is a combination of elemental bromine and a blend of a chlorinated hydrocarbon, preferably carbon tetrachloride, and an alcohol. The alcohol is preferably selected from the group consisting of alcohols having one or more hydroxyl moieties and containing from 1 to 12 carbon atoms ($C_{1-12}$), more preferably mono-hydroxy alcohols having from 1 to 8 carbon atoms ($C_{1-8}$) and still more preferably mono-hydroxy alcohols having from 1 to 4 carbon atoms ($C_{1-4}$). As used herein, nomenclature listing a number of carbon atoms includes each member of the range.

As used herein, weight average molecular weight or number average molecular weight means an apparent molecular weight as measured by Gel Permeation Chromatography (GPC), relative to a polybutadiene standard.

Preparation of Thermally Stable Brominated Butadiene Copolymers of the Present invention preferably occurs via selective bromination, more preferably via bromination that is selective and mild rather than aggressive. Bromination preferably occurs ionically, more preferably cationically, rather than via a free radical mechanism. Still more preferably, bromination of butadiene copolymers proceeds substantially without, preferably completely without, free radical substitution reactions. Ionic bromination is preferred over free radical bromination as the latter is believed to form tertiary bromine products that are, in turn, a probable primary contributing factor to poor thermal stability. In addition, free radical bromination is believed to brominate benzylic groups within vinyl aromatic moieties in addition to brominating unsaturation present within butadiene moieties of a vinyl aromatic/butadiene copolymer. Ionic bromination products appear to have thermal stability values that approach that of HBCD.

Brominated copolymers of the present invention desirably have a tertiary bromine content that is low enough to avoid adverse effects upon thermal stability of the brominated copolymers. While it does not qualify as a direct measure of tertiary bromine content, 5% WLT serves as an indirect indicator of the presence of tertiary bromine moieties. For purposes of the present invention, a 5% WLT of at least (or greater than or equal to) 200° C. suggests that the tertiary bromine content is sufficiently low. The 5% WLT is preferably at least 205° C., more preferably at least 210° C., even more preferably at least 215° C., still more preferably at least 220° C. and yet more preferably at least 225° C. This is especially true when the brominated copolymers have an unbrominated or residual non-aromatic double bond content less than or equal to 15 percent, based upon non-aromatic double bond content prior to bromination. A residual double bond content of more than 15 percent, but less than 100 percent, is believed to improve 5% WLT, thereby mitigating to some extent the effects of excessive tertiary bromine content.

"Mild", as used herein with respect to bromination reactions, refers to reactions that use a selective brominating agent, preferably a tribromide such as a tetra-alkylammonium tribromide or pyridinium tribromide, and minimize, preferably eliminate, formation of tertiary bromine moieties such as tertiary bromides.

"Aggressive", as used herein with respect to bromination reactions, means conditions that result in formation of tertiary bromides. Use of elemental or molecular bromine as a brominating agent provides one route to formation of tertiary bromides.

"Thermally stable" or "thermal stability", as used herein with respect to a brominated butadiene/vinyl aromatic monomer copolymer means that a 10 milligram (mg) sample of the polymer, when subjected to thermogravimetric analysis (TGA) under a 60 milliliter per minute (ml/min) flow of gaseous nitrogen with a heating rate of 10° C./minute (10° C./min), experiences a weight loss of 5%, relative to starting brominated copolymer weight, at a temperature in excess of 200° C. preferably at least 220° C., more preferably as much as 230° C., if not higher. Such a 5% weight loss temperature (WLT) appears to make the brominated copolymer suitable for melt compounding with, for example, an alkenyl aromatic polymer or vinyl aromatic polymer such as polystyrene with or without a foaming agent.

As used herein, "alkenyl aromatic" and "vinyl aromatic", whether used to modify "monomer" or "polymer", have the same meaning and the generic use of either term includes both substituted (for example poly(alpha-methylstyrene), ring-substituted (for example halogenated styrenes such as 2- or 4-bromostyrene, alkoxylated styrenes such as 2- or 4-methoxystyrene, nitrated styrenes (for example 2-nitrostyrene or 4-nitrostyrene), and alkylated styrenes such as 2- or 4-methylstyrene or 2,4-dimethylstyrene), and unsubstituted species (for example polystyrene homopolymer), as well as copolymers (for example styrene/acrylonitrile copolymers) or interpolymers (for example ethylene/styrene interpolymers, or ethylene/propylene/styrene interpolymers).

A variety of references teach selective halogenation of dienes in general and selective bromination of dienes, especially PBDs, in particular. G. Dall' Asata et al., in *Die Makromolekulare Chemie*, 154, 279-290 (1972), teach that one may avoid substitution halogenation via free radical mechanisms by using methylene chloride as a solvent as opposed to carbon tetrachloride or benzene, both of which lead to free radical substitutions. H. Kawaguchi et al., in *Polymer*, 26, 1257-1264 (1985), discuss bromination of high cis-1,4-polybutadiene under dilute conditions (0.5% concentration) of 1,2-dibromoethane in solvent mixtures of methylene chloride and tetrahydrofuran (THF), at 0° C. and in the absence of oxygen. Ceausescu et al., in J. Macromolecular Science-Chemistry, A22 (5-7), 803-818 (1985), observes that brominated polybutadiene prepared with elemental bromine has poor thermal stability, and appears to release bromine and turn pink or brown even at room temperature. Ceausescu's observations refer to Br-PBD having both low (5%) and high (60%) 1,2 isomer content.

Ammonium tribromides, such as pyridinium tribromide, are known to be mild and selective brominating agents. See, for example, *Advanced Organic Chemistry* (March, 2$^{nd}$ Edition, 1977), p. 741. They tend to be solid materials and are easier to handle than elemental bromine. Other ammonium tribromides include tetramethyl ammonium bromide (*Journal of Organic Chemistry*, 28, 3256 (1963)), phenyltrimethyl ammonium tribromide (*Chem. Letters*, page 627 (1987); *Tetrahedron*, 50, page 6433 (1994)), cetyl trimethylammonium tribromide and tetrabutyl ammonium tribromide (Journal of the *American Chemical Society* (JACS), 73, page 4525 (1951)), and 1,8-diazabicyclo[5,4,0]-tetrabutylammonium tribromide (*Journal of Organic Chemistry*, 57, page 2740 (1992)). Pre-formed tetra-alkylammonium tribromides may be used or the tribromide may be formed in-situ by addition of elemental bromine to a solution of tetra-alkylammonium monobromide in a suitable solvent. Another alternative is to add bromine to an aqueous solution of a tetra-alkylammonium monobromide, followed by dissolution of the product in a suitable solvent. The resulting solution may then be used as the brominating agent.

*Tet Letters*, 35, 7429-7432 (1994) reports a mild and selective bromination in a two phase system involving an aqueous phase and an organic substrate. The aqueous phase contains hydrogen peroxide, catalytic amounts of ammonium metavanadate ($NH_4VO_3$), and potassium bromide. The organic substrate or double bond containing compound is dissolved in chloroform. The bromination reportedly gives greater than 98% yields for dibromides of terminal olefins that are similar to a polybutadiene vinyl microstructure double bond.

Polydiene stereochemistry in general, and butadiene stereochemistry in particular, is believed to play a key role in determining thermal stability of brominated butadiene/vinyl aromatic monomer copolymers. The brominated butadiene copolymers of the present invention have a measurable (or example greater than zero percent by weight (wt %), desirably greater than 10 wt %, preferably greater than 15 wt %, more preferably greater than 20 wt % and still more preferably greater than 25 wt %, in each case based upon total butadiene moiety weight) vinyl or 1,2-butadiene isomer content. The brominated butadiene copolymers preferably have a high 1,2-butadiene isomer content. "High", as used herein, means a vinyl or 1,2-butadiene isomer content in excess of 50%, preferably in excess of 55%, more preferably in excess of 60% and still more preferably in excess of 70%, with vinyl or 1,2-butadiene isomer contents in excess of 85% or even 90% being especially preferred, each percentage being based upon total butadiene isomer content of the copolymer.

The brominated copolymers of the present invention begin with an unbrominated copolymer of butadiene and a vinyl aromatic monomer. The unbrominated copolymer may be a block copolymer, a random copolymer or a graft copolymer. Unbrominated copolymers are readily available commercially. Unbrominated random and graft copolymers can be prepared by methods outlined below. Preparation of unbrominated copolymers is not, however, part of the present invention. Illustrative commercially available unbrominated copolymers include styrene/butadiene block copolymers available from Dexco Polymers under the trade designation VECTOR™. Soluble, gel-free styrene/butadiene random copolymers may be prepared in accord with teachings of A. F. Halasa in *Polymer*, Volume 46, page 4166 (2005). Styrene/butadiene graft copolymers, while not commercially available, may be prepared in accord with teachings of A. F. Halasa in *Journal of Polymer Science* (Polymer Chemistry Edition), Volume 14, page 497 (1976). Styrene/butadiene random and graft copolymers may also be prepared in accord with teachings of Hsieh and Quirk noted in the immediately succeeding paragraph.

Henry L. Hsieh and Roderic P. Quirk discuss stereochemistry of polymerization in chapter 9 of *Anionic Polymerization Principles and Practical Applications*, Marcel Dekker, Inc., New York, 1996. They note, at page 197, that polymerization of "1,3-dienes to yield homopolymers or copolymers (random or block) with various proportions of cis-1,4-, trans-1,4-, and vinyl microstructures . . . depends on the counterion, the solvent, the chain end concentration, the monomer concentration, the temperature, and the presence of Lewis base additives". As shown in Table 9.5 on page 211, polar solvents contribute to high vinyl or 1,2-content polybutadienes, with the lowest 1,2-content being 41% for dioxane as a polar solvent and cesium as a counterion and the highest being 92% for tetrahydrofuran (THF) as the polar solvent and lithium as the counterion. Section E (pages 217-222) and Table 9.9 (page 217) shed light on effects of temperature and Lewis base on vinyl content with lower temperatures (for example 5° C.) being more favorable to high vinyl content than high temperatures (for example 70° C.) and certain bases, such as bispiperidinoethane (DIPIP), providing vinyl contents as high as 99.99% at 5° C. With the guidance provided by Hsieh and Quirk, the teachings of which are incorporated herein by reference to the maximum extent allowed by law, a skilled artisan can prepare butadiene/alkenyl aromatic monomer copolymers with a desired vinyl or 1,2-butadiene content without undue experimentation.

J. F. Henderson and M. Szwarc disclose, in *Journal of Polymer Science* (D, Macromolecular Review), Volume 3, page 317 (1968), the teachings of which are incorporated herein to the maximum extent allowed by law, that anionic polymerization chemistry can be used to make polybutadiene with controlled microstructure and molecular weight. They note that with proper choice of polar modifiers, 1,2-isomer content of polybutadiene can be varied from as little as 10% to nearly 100%. Anionic polymerization also offers a potential to attach a polystyrene block to make a styrene-butadiene block copolymer (SBC).

While anionic polymerization may be preferred over other means of obtaining a desired high vinyl microstructure percentage, skilled artisans understand that such other means may also be used. See, for example Y. Tanaka, Y. Takeuchi, M. Kobayashi, H. Tadokoro, *J. Polym. Sci.* A-2, 9, 43-57 (1971), J. Zymona, E. Santte, H. Harwood, *Macromolecules*, 6, 129-133 (1973), and H. Ashitaka, et al, *J. Polym. Sci., Polym. Chem.*, 21, 1853-1860 (1983) for teachings on preparation of high vinyl polybutadiene by coordination polymerization.

Preferred brominated butadiene/vinyl aromatic monomer copolymers are fully brominated or nearly so. "Fully brominated", as used in reference to such copolymers, means that double bonds or unsaturation present in the butadiene moiety prior to bromination are completely brominated. While a partially brominated butadiene copolymer may be more thermally stable than a fully brominated version of the same butadiene copolymer, such increased thermal stability comes at a cost.

With an increase in number of unreacted double bonds in the butadiene copolymer, it appears that some of the double bonds yield cross-linked moieties, especially when the brominated butadiene copolymer is blended with a vinyl aromatic polymer such as polystyrene. The cross-linked moieties are undesirable because they may result in fouling of the extrusion process equipment and appear as insoluble gels in resulting products. The gels may lead to one or more of impaired physical properties, blemished surface or optical properties, or increased color formation. When such blends are converted to foam structures, the cross-linked moieties tend to adversely affect foam formation, leading to non-uniform foam structures.

As butadiene copolymer molecular weight increases, blends of brominated butadiene copolymer and a vinyl aromatic or alkenyl aromatic polymer (either unsubstituted or substituted) or copolymer, such as, respectively, polystyrene, poly(alpha-methyl) styrene or styrene/acrylonitrile copolymer, show little, if any, increase in brominated butadiene copolymer domain size. By way of contrast, brominated butadiene homopolymer domain size increases as molecular weight increases in blends where the homopolymer is substituted for an equal amount of brominated copolymer and the blends are subjected to the same mixing conditions. A domain size in excess of 10 micrometers (μm) may interfere with certain end use applications for such blends, such as conversion of the blends into polymeric foam. At the same time, it is also believed that increased brominated butadiene copolymer domain size decreases brominated butadiene copolymer surface area and lessens its effectiveness as a flame retardant additive. As such, a domain size of less than (<) 10 μm is preferred, with a domain size of less than or equal to (≦) 5 μm being especially preferred.

Blends of brominated butadiene copolymer and vinyl aromatic or alkenyl aromatic polymers (including alkenyl aromatic homopolymers, alkenyl aromatic copolymers, or blends of one or more alkenyl aromatic homopolymers and/or alkenyl aromatic copolymers) preferably a flame retarding amount of brominated butadiene copolymer. The flame retarding amount is an amount sufficient to provide a molded article or foamed article, whichever is appropriate, with a bromine content within a range of from 0.1 percent by weight to 25 percent by weight, based upon blend weight. A bromine content below 0.1 percent does not provide an acceptable flame retarding performance. While bromine contents above 25 percent may be prepared, cost of brominated copolymer sufficient to provide such a bromine content tend to make the product economically unattractive and may also have an adverse affect on final product physical properties.

Blends of brominated butadiene copolymer and vinyl aromatic or alkenyl aromatic polymer preferably include other additives selected from the group consisting of flame retardant additives, flame retardant adjuvants, thermal stabilizers, ultraviolet light stabilizers, nucleating agents, antioxidants, foaming agents, acid scavengers and coloring agents.

The brominated butadiene/vinyl aromatic monomer copolymer is preferably a Br-SBC. The SBC, prior to bromination, may be any of di-block copolymer (for example styrene-butadiene), triblock copolymer (for example styrene/butadiene/styrene or SBS), tetrablock copolymer (for example styrene/butadiene/styrene/butadiene or SBSB) or multiblock copolymer (for example styrene/butadiene/styrene/butadiene/styrene or SBSBS). SBCs may be prepared by any process known in the art including random polymerization with preparation via sequential anionic polymerization or by coupling reactions being preferred. Of the foregoing, brominated triblock copolymers such as SBS block copolymers are especially preferred.

While Br-SBCs are preferred, the brominated butadiene/vinyl aromatic monomer copolymer may also be a random copolymer prepared by conventional free radical polymerization, or by modifications of anionic polymerization (such as use of polar modifiers) or a graft copolymer prepared by grafting, for example, a polymerized styrene monomer chain onto a PBD backbone. Henry L. Hsieh and Roderic P. Quirk discuss randomization of co-polymerization in chapter 15 (pp. 407-408) of *Anionic Polymerization Principles and Practical Applications*, Marcel Dekker, Inc., New York, 1996. In chapter 14 (page 372) of the same reference, Hsieh and Quirk discuss grafting via metalation reactions.

When Br-SBCs or other brominated butadiene copolymers are blended with an alkenyl aromatic polymer or copolymer such as polystyrene, dispersibility of the Br-SBC in the alkenyl aromatic polymer or copolymer varies with styrene block content of the brominated butadiene copolymer (for example Br-SBC) prior to bromination. As a general rule with SBC as an example, a styrene block content of at least (≧) 10 to 15 percent by weight (wt %), preferably at least 30 wt %, based upon non-brominated SBC weight, is needed for improved dispersibility of the Br-SBC in an alkenyl aromatic (co)polymer. With increasing styrene block content, blends of, for example, Br-SBC and polystyrene, become more compatible and, with a styrene block content of ≧80 wt % in the block copolymer prior to bromination, tend to be viewed as miscible.

Copolymers suitable for use in preparing brominated copolymers of the present invention have polymerized therein a butadiene moiety and a vinyl aromatic monomer moiety. The vinyl aromatic moiety preferably constitutes from 5 to 90 percent by weight, based upon copolymer weight, of the copolymer. The vinyl aromatic moiety is preferably selected from the group consisting of styrene, alpha-methyl styrene, para-methyl styrene, and mixtures thereof.

Brominated copolymers (Br-SBCs as well as Br-r-SBs and Br-g-SBs), prior to bromination, have the following key properties: a weight average molecular weight ($M_w$) within a range of from 1,000 to 200,000, preferably from 2,000 to 100,000, more preferably from 5,000 to 100,000 and even more preferably, at least from a commercial availability point of view, from 50,000 to 100,000; and a polymerized vinyl aromatic monomer content of at least 5 wt %, preferably within a range of from 5 wt % to 90 wt %, based upon block copolymer weight; and a measurable 1,2-isomer content as specified above.

Analytical Procedures

Thermogravimetric analysis (TGA) of a sample having a nominal sample weight of 10 milligrams (mg) is performed using a TA Instruments Hi-Res TGA 2950 with a 60 milliliters per minute (ml/min) flow of gaseous nitrogen and a heating rate of 10° C./min over a range of from room temperature (nominally 25° C.) to 600° C. This method provides a temperature at which a sample undergoes a cumulative weight loss of 5 wt %, based on initial or starting sample weight.

Molecular weight is determined by Gel Permeation Chromatography (GPC) using an Agilent 1100 series liquid chromatograph equipped with two Polymer Laboratories PLgel 5 micrometer Mixed-C columns connected in series and an Agilent G1362A refractive index detector. Tetrahydrofuran (THF) flowing at a rate of 1 ml/min and heated to a temperature of 35° C. is used as an eluent. Molecular weights are reported relative to polybutadiene standards.

Proton Nuclear Magnetic Resonance (p-NMR) spectroscopy is used to determine residual double bond percentage, polymerized styrene monomer content and 1,2 isomer content by comparing integrated areas of signals due to appropriate protons (residual double bond protons are between 4.8 and 6 ppm) (relative to tetramethylsilane (TMS)), styrene aromatic protons are between 6.2-7.6 ppm, and protons for brominated polybutadiene are between 3.0 and 4.8 ppm). A Varian INOVA™ 300 NMR spectrometer can be used as the NMR device, being operated with a delay time of 30 seconds to maximize relaxation of protons for quantitative integrations. Deutero-chloroform (chloroform-d) is used as a solvent for Br-SBCs and d5-pyridine is used as a solvent for Br-PBDs.

Polymer blends are prepared using a 50 ml capacity Haake mixer with a temperature setting of 180° C., a mixing speed of 40 revolutions per minute (rpm) and a mixing time of 8 min.

Sample Preparation Procedure

Blends of a vinyl aromatic resin, either general purpose polystyrene (GPPS, STYRON™ 168, The Dow Chemical Company) or a styrene/acrylonitrile (SAN) resin as described below, and either Br-PBD or Br-SBC are prepared using a Haake RHEOCORD™ 90 apparatus that has a Haake 24124 controller and an attached Rheomix 800 mixing bowl containing roller blade mixers. Each batch or blend contains a total of 50 grams (g) of resin and additives. The bowl is heated to 180° C. and the resins are added to the bowl under low speed (less than 40 revolutions per minute (RPM)). After a portion of the vinyl aromatic resin melts to facilitate melt mixing, blend speed is increased to 40 RPM and blending is continued for 8 minutes (min). If an additive such as an organotin carboxylate stabilizer is to be included in the blend, it is blended with the brominated resin before blending the latter with the vinyl aromatic resin.

Molding of Sample Plaques

Solidified melt blends prepared as described above are ground using a Wiley lab grinder and a 3 millimeter (mm) screen size before molding. 25 to 27 g aliquots of the ground material are compression molded into plaques measuring 100 mm×100 mm×1.5 mm using a Pasadena Hydraulic Platen Press (Model # BLA44-C-6M2-DX2357) operating at a set point temperature of 180° C. with a pressure application time of 5 min and an applied pressure of 25,000 pounds per square inch (psi) (172 megapascals (MPa)). A small band saw is used to cut the molded plaques into strips for Limiting Oxygen Index (LOI) and FP-7 ignitability tests.

Preparation of Foams

As a precursor step to making polymer foam, a concentrate of 10 wt %, based on concentrate weight, brominated polymer (either Br-PBD or Br-SBC) in vinyl aromatic polymer (either GPPS or SAN) is prepared. As an initial step, a powdered organotin carboxylate stabilizer (for example THERMCHEK™ 832, commercially available from Ferro Corporation) or a liquid organotin carboxylate stabilizer (THERMCHEK™ 835, commercially available from Ferro Corporation) is blended at a loading of 2 wt %, based on blend weight, with the brominated polymer. The blend is added to a powder feeder. The blend is melt compounded with the vinyl aromatic resin using a Haake RHEOCORD™ 90 twin screw extruder equipped with a stranding die. The extruder has three temperature zones operating at set point temperatures of 135° C., 170° C. and 180° C. and a die set point temperature of 180° C. Extruded strands are cooled in a water bath and cut into pellets approximately 5 mm in length using a lab scale YELLOW JACKET™ brand pelletizer.

The pellets are converted into a foam using, in sequence, a 25 mm single screw extruder with three heating zones, a foaming agent mixing section, a cooler section and an adjustable 1.5 mm adjustable slit die. The three heating zones operate at set point temperatures of 115° C., 150° C. and 180° C. and the mixing zone operates at a set point temperature of 200° C. Foaming agent (4.5 parts by weight (pbw) of carbon dioxide with or without 0.5 pbw of water, both pbw being based upon 100 pbw combined weight of brominated resin and vinyl aromatic resin) is fed into the foaming agent mixing section using two different RUSKA™ (Chandler Engineering Co.) syringe pumps. Concentrate pellets and pellets of vinyl aromatic polymer resin (for example GPPS) are dry blended together with 0.05 wt %, based on dry blend weight, of barium stearate as a screw lubricant. Concentrate pellet amounts are varied relative to vinyl aromatic polymer resin pellet amounts to attain a desired level of brominated polymer in the dry blend. The dry blend is added to the extruder's feed hopper and fed to the extruder at a rate of 2.3 kilograms per hour (kg/hr). Pressure in the mixing section is maintained above 1500 psi (10.4 MPa) to provide a polymer gel having uniform mixing of vinyl aromatic polymer and foaming agent and promote formation of a foam with a uniform cross-section. The coolers lower the foamable gel temperature to 120° C. to 130° C., preferably 128° C. to 129° C. The die opening is adjusted to maintain a die back pressure of at least 1000 psi (6.9 MPa). The foamable gel expands to form foam as it exits the die. The foam is recovered using conventional procedures.

While the foregoing foam preparation procedure uses carbon dioxide, optionally in combination with water, as a foaming agent, foaming agent selection is not critical and any conventional foaming agent or foaming agent blend known to those skilled in the art may be used to make polymer foam. In addition, while said procedure illustrates an extruded foam process, skilled artisans may modify the foregoing procedure to make an expanded polymer bead foam using conventional technology such as a strand die, rather than a foaming die such as a slit die, to form extruded foamable polymer strands, pelletizing the strands, placing pellets in a mold and heating the pellets to activate the blowing or expanding agent and render at least surface portions of the beads sufficiently tacky that expansion of the pellets or beads forms a unitary article.

LOI

LOI testing is performed in accordance with a modified version of American Society for Testing and Materials (ASTM) Test D 2863. For solid samples, the modification involves using samples cut from molded plaques that measure 100 mm×6.5 mm×1.5 mm. For foam samples, the modification involves using a foam strand die to produce a foam rod that has a circumference of 5 mm and cutting the rod into lengths of 150 mm.

FP-7

Alvin R. Ingram describes this small scale "resistance to ignition" test, designated as "FP-7" for purposes of this application, in *Journal of Applied Polymer Science*, Vol. 8 (1964), p 2485-93 and shows an apparatus on page 2486. The apparatus operates to automatically move a micro-burner ignition source under the first 6 mm of a foam sample or plaque sample, whichever is appropriate, apply a flame from the source to the sample for a period of 3 seconds, remove the ignition source and automatically start a timer. An operator turns off the timer when flame extinguishment occurs. An FP-7 value for a sample is an average of six different test samples from a single plaque or foam rod, whichever is appropriate.

Foam sample density is determined according to ASTM D3575-93, Suffix W, Method A (foam volume is determined by linear measurement of a specimen (a 10 centimeter (cm) cross-section that is cut from a foam), the specimen is weighed and apparent density (weight per unit volume) and foam cell size are calculated according to ASTM D3576.

The following examples illustrate, but do not limit, the present invention. All parts and percentages are based upon weight, unless otherwise stated. All temperatures are in degrees centigrade (° C.). Examples (Ex) of the present invention are designated by Arabic numerals and Comparative Examples (Comp Ex) are designated by capital alphabetic letters.

PBD Preparation

PBD is prepared by anionic polymerization, using a glass polymerization reactor with an internal volume of 1200 milliliters (ml). All operations are performed under a nitrogen atmosphere of 30 pounds per square inch (psi) (207 kilopascals (kPa)). Polymer molecular weight is controlled via a ratio of moles of butadiene monomer to moles of sec-butyl lithium (Sec-BuLi) initiator and 1,2 isomer content by selection and addition of polar additives.

In sequence, the dry solvent (for example cyclohexane) is first added to the reactor, an initiator solution is then injected and, when used, a polar additive is added by syringe. Butadiene monomer is then transferred to the reactor using a stainless steel shot tank.

Polymerizations conducted in the absence of a polar additive continue for 2 hours at a set point temperature of 40° C. and yield a 1,2 isomer content of 10%. The same polymerization time is used, but the set point temperature is reduced to room temperature (nominally 25° C.) for polymerization in the presence of a polar additive. Polar additives and their typical amount relative to moles of sec-BuLi initiator are dipiperidinoethane (DIPIP, range of 2:1 to 4:1 molar ratio of DIPIP/Li initiator), N,N,N',N'-Tetramethylethylenediamine (TMEDA, range of 1:1 to 6:1), tetrahydrofuran (THF, range of 16:1 to 100:1, depending on level of 1,2 isomer desired), and ditetrahydrofurfurylpropane (DTHFP, 8:1). Table 1 below summarizes data relative to polar additive (when used), % 1,2-isomer, wt % polymerized styrene moiety (where appropriate), type of polymer (when the polymer is other than PBD), polymer $M_n$ and polymer $M_w$.

Polymerization is terminated by adding an initiator poison such as deoxygenated 2-propanol; the resulting PBDs are isolated by precipitation in 2-propanol; the PBDs are separated from 2-propanol by filtration; and the filtrates are dried overnight in a vacuum oven operating at a set point temperature of 50° C.

In an illustrative procedure, preparation of a PBD designated as PB-4 is initiated by adding the following components to the reactor: 700 ml of dry cyclohexane; dipiperidinoethane (DIPIP, 5.70 g, 0.029 mol) as a polar compound and a Sec-BuLi initiator solution (1.6 M (molar) solution in cyclohexane, 4.5 ml, 0.0072 mol); and butadiene monomer (43.5 g, 0.81 mol). After allowing polymerization to proceed for 2 hours at room temperature, the polymerization is terminated by adding 2 ml of de-oxygenated 2-propanol to the contents of the reactor. Reactor contents are concentrated to a volume of 150 ml using a rotary evaporator. PBD is isolated from the concentrated contents by precipitation in 500 ml of 2-propanol. The precipitate is recovered and dried as detailed above.

The preparation of PBD-4 is replicated, but the ratio of butadiene monomer is varied to Sec-BuLi to prepare PBD-5 and PBD-6. Similarly, varying amounts of TMEDA are substituted for DIPIP to make PBD-2 and PBD-3. Similarly varying amounts of tetrahydrofuran (THF) are substituted for DIPIP to make PBD-7 and PBD-8. Finally, PBD-4 is replicated, omitting the polar compound to make PBD-1. PBD-9 is available from Sigma-Aldrich as product number 466867. As it is available as a product, no information is available as to solvent and polar modifier used in preparation of the product. Accordingly, Table 1 below shows the polar modifier as "unknown". Polymer data is summarized in Table 1 below.

Preparation of SBCs

The procedure used to prepare PBDs is modified by polymerizing styrene monomer before beginning butadiene polymerization. After adding cyclohexane to the reactor, a cannula is used to transfer dry styrene monomer into the reactor. Initiator as described above is added and polymerization is allowed to proceed for 1 hour at room temperature (nominally 25° C.) before polar modifier and butadiene monomer are added sequentially. After adding the butadiene monomer, the polymerization is allowed to proceed an additional 2 hours. For a diblock copolymer structure, polymerization is terminated by adding 2-propanol as described above. For a triblock copolymer structure, an additional amount of styrene monomer is added and polymerization is continued for an additional hour before being terminated with 2-propanol. Relative weights or proportions of styrene and butadiene monomers are adjusted to prepare a desired composition. SB-1 through SB-15 and SBC-17 through SBC-21, shown in Table I below, represent diblock or triblock SBCs having varying percentages of 1,2 isomer, wt % styrene, $M_n$ and $M_w$ that are prepared with or without a polar modifier, also as shown in Table 1 below.

Preparation of Random SB (r-SB, SBC-16)

The procedure used to prepare SBC is modified by adding cyclohexane, styrene and butadiene monomers to the reactor before adding a solution of sec-butyl lithium initiator and TMEDA (polar additive) in cyclohexane.

"SIS" designates a triblock copolymer of isoprene and styrene commercially available from Sigma-Aldrich as product number 43241-5. Polyisoprene may contain any or all of 1,4 isomer, 1,2 isomer and 3,4 isomer. An NMR spectrum of SIS suggests it contains primarily the 1,4 isomer.

Abbreviations used in Table 1 include: "NM"=not measured; "R"=random; "TB"=triblock; and "DB"=diblock.

TABLE 1

| Sample Identification | % 1,2 isomer | Polar Modifier | wt % Styrene/ Polymer type | Polymer $M_n$ | Polymer $M_w$ |
|---|---|---|---|---|---|
| PBD-1 | 9 | None | N/A | 6500 | 7200 |
| PBD-2 | 75 | TMEDA | N/A | 4500 | 4600 |
| PBD-3 | 80 | TMEDA | N/A | 41,300 | 42,600 |
| PBD-4 | 94 | DIPIP | N/A | 5400 | 5500 |
| PBD-5 | 94 | DIPIP | N/A | 49,000 | 51,000 |
| PBD-6 | 93 | DIPIP | N/A | 4100 | 4200 |
| PBD-7 | 43 | THF | N/A | 106,000 | 111,000 |
| PBD-8 | 61 | THF | N/A | 73,300 | 77,200 |
| PBD-9 | 85 | Unknown | N/A | 1400 | 2500 |
| SIS | NM | none | 22/TB | 94,700 | 110,400 |
| SBC-1 | 78 | TMEDA | 32/DB | 5300 | 5500 |
| SBC-2 | 75 | TMEDA | 31/DB | 33,200 | 34,500 |
| SBC-3 | 93 | DIPIP | 34/DB | 5300 | 5500 |
| SBC-4 | 92 | DIPIP | 34/DB | 21,500 | 22,500 |
| SBC-5 | 72 | TMEDA | 37/DB | 47,700 | 50,200 |
| SBC-6 | 9 | None | 36/DB | 63,800 | 65,400 |
| SBC-7 | 10 | None | 29/TB | 56,700 | 60,000 |
| SBC-8 | 10 | None | 43/TB | 41,000 | 43,700 |
| SBC-9 | 74 | TMEDA | 37/DB | 54,800 | 57,800 |
| SBC-10 | 76 | TMEDA | 36/TB | 48,000 | 50,500 |
| SBC-11 | 84 | DTHFP | 35/DB | 61,000 | 63,000 |
| SBC-12 | 81 | DTHFP | 41/TB | 67,000 | 70,000 |
| SBC-13 | 96 | DIPIP | 47/DB | 17,400 | 18,000 |
| SBC-14 | 90 | DIPIP | 62/DB | 15,600 | 16,300 |
| SBC-15 | 92 | DIPIP | 82/DB | 11,800 | 12,400 |
| SBC-16 | 65 | TMEDA | 22/R | 138,000 | 208,000 |
| SBC-17 | 37 | DMP | 60/DB | 15,800 | 16,300 |
| SBC-18 | 88 | DIPIP | 42/DB | 32,300 | 33,900 |
| SBC-19 | 43 | THF | 43/TB | 58,000 | 61,700 |
| SBC-20 | 54 | THF | 42/TB | 65,000 | 69,000 |
| SBC-21 | 80 | TMEDA | 35*/DB | 43,700 | 45,600 |

*means that the styrenic monomer is 4-methyl styrene

COMP EX A-B

Room Temperature Bromination Using Elemental Bromine

A solution of 5.0 grams (g) of a PBD (see Table 2 below for choice of PBD) (0.0926 mole of polybutadiene repeat units) in 100 ml of chloroform is added to a 500 ml 2-neck flask. A 50 ml pressure equalizing addition funnel is inserted into one neck of the flask and a condenser, along with a drying tube filled with DRIERITE (anhydrous calcium sulfate) to protect the reaction from moisture, is inserted into the other neck of the flask. The flask is wrapped in aluminum foil to exclude light. Into the addition funnel, 30 ml chloroform and 4.8 ml of bromine (14.8 g, 0.0926 mol) are added. With stirring, the bromine solution is added over a period of 30 minutes. Stirring is continued for an additional 30 minutes reaction time. Stirring is then stopped and the contents of the flask transferred to a separatory funnel and shaken with a solution of 5 g sodium hydrogen sulfite in 100 g distilled water. 40 ml THF is added to the shaken contents to facilitate phase separation into an organic layer and an aqueous layer. The organic layer is washed further with 100 ml distilled water. Br-PBD is isolated by precipitation into a 5-fold excess (based on solution volume) of methanol. Br-PBD precipitate is separated by filtration and dried overnight in a vacuum oven operating at a set point temperature of 70° C. Throughout preparation in Comp Ex A and B, air is used rather than an inert gas. WLT, $M_n$ and $M_w$ data are summarized in Table 2 below.

TABLE 2

| Comparative Example | PBD | % 1,2 Isomer | BrPBD 5% WLT (° C.) | BrPBD $M_n$ | BrPBD $M_w$ |
|---|---|---|---|---|---|
| A | PBD-1 | 9 | 154 | 6500 | 7200 |
| B | PBD-2 | 75 | 160 | 4600 | 4800 |

The data presented in Table 2 demonstrate that aggressive bromination conditions using elemental bromine results in poor thermal stability, as indicated by a 5% WLT less than 200° C., without regard to 1,2 isomer content.

COMP EX C

Comp Ex A-B are replicated, substituting methylene chloride ($MeCl_2$) for chloroform, and using an SBC (SBC-5, 72% 1.2 isomer) in place of PBD-1 or PBD-2. Bromination is effected at 0° C. rather than 25° C. and argon is substituted for the air used in Comp Ex A-B. The resulting Br-SBC has a 5% WLT of 145° C., $M_n$ of 140,000 and $M_w$ of 239,000.

A comparison of Comp Ex B and Comp Ex C shows that a combination of a) use of a SBC in place of a PBD, b) a 25° C. reduction in bromination temperature and c) an increase in both $M_n$ and $M_w$ fails to improve thermal stability as evidenced by a 15° C. drop in 5% WLT. As the combination fails, any single component of the combination should yield similar results.

COMP EX D

Using the same apparatus as in Comp Ex A, a solution of 16.1 g of pyridinium tribromide (PTB) (0.050 mole) in 20 ml THF is added to a solution of 2.6 g (0.048 mol) PBD-1 (9% 1,2 isomer content) in 50 ml THF over a period of 30 minutes. After 48 hours reaction time, byproduct pyridinium hydrobromide (PHB) is removed by filtration. The resulting polymer solution is passed through a bed of cationic ion exchange resin to remove residual PHB from the solution. Br-PBD is recovered as in Comp Ex A. The Br-PBD has a 5% WLT of 191° C., a $M_n$ of 8100 and a $M_w$ of 8600. A 5% WLT below 220° C., especially below 200° C., shows that even a mild brominating agent cannot produce a low 1,2-isomer content Br-PBD of desired thermal stability.

Similar, if not identical, results are expected from use of a modified process wherein one places both pyridinium tribromide and PBD in the apparatus and then adds THF to provide a reaction solution.

COMP EX E

Comp Ex D is replicated, substituting SIS for PB-1, to yield a Br-SBC with a 5% WLT of 154° C., $M_n$ of 124,000 and $M_w$ of 155,000. The relatively low 5% WLT suggests that brominated isoprene-containing block copolymers have poor thermal stability, even with use of a mild brominating agent such as pyridinium tribromide. A potential explanation for the poor thermal stability lies in a tendency to generate tertiary bromides during bromination of isoprene-containing polymers.

COMP EX F

Comp Ex A is replicated, using SBC-12 rather than PBD-1 and substituting THF for chloroform as a solvent. The resulting Br-SBC has a 5% WLT of 220° C., a dramatic improvement over the 5% WLT of Comp Ex A. Nonetheless, the Br-SBC turns a brown color after drying in a vacuum oven and shows evidence of radical coupling when subjected to gel permeation chromatography (GPC) analysis. In addition, NMR analysis shows that THF is present in more than 50 mole percent of polymer repeat units within the Br-SBC. While the 5% WLT may be acceptable, the presence of THF and the fact that the polymer turns a brown color render the Br-SBC unsuitable for use as a bromine-containing FR additive.

COMP EX G-M

Bromination of PBD with Pyridinium Tribromide

Comp Ex D is replicated, but using a PBD having a higher 1,2 isomer content than PBD-1. PBD selection, 1,2-isomer content, Br-PBD $M_n$, Br-PBD $M_w$ and 5% WLT are summarized in Table 3 below. The residual non-aromatic double bond content is less than 5 percent, based upon non-aromatic double bond content prior to bromination.

TABLE 3

| Comp Ex No | PBD | % 1,2 isomer | BrPBD $M_n$ | BrPBD $M_w$ | 5% WLT (° C.) |
|---|---|---|---|---|---|
| G | PBD-2 | 75 | 4800 | 4900 | 215 |
| H | PBD-3 | 80 | 43,100 | 44,500 | 215 |
| I | PBD-4 | 94 | 5300 | 5400 | 220 |
| J | PBD-5 | 94 | 45,700 | 48,600 | 224 |
| K | PBD-6 | 93 | 3900 | 4100 | 217 |
| L | PBD-7 | 43 | 141,000 | 160,000 | 215 |
| M | PBD-8 | 61 | 93,500 | 99,700 | 218 |

A comparison of the 5% weight loss temperatures in Table 3 shows that selective bromination under mild bromination conditions as in Comp Ex G-M provides a significantly more stable brominated polybutadiene product than aggressive bromination with elemental bromine as in Comp Ex A-C. As shown below, however, brominated butadiene copolymers unexpectedly have better thermal stability than brominated butadiene homopolymers.

EX 1-18

Bromination of a Styrene-Butadiene Block Copolymer with Pyridinium Tribromide

The procedure of Comp Ex G-M is replicated, but using a SBC in place of a PBD (keeping same mole ratio of PTB to polybutadiene block) and procedures used to recover brominated polymer are modified because Br-SBCs have higher solubility in other solvents such as toluene. After filtration to remove byproduct pyridinium hydrobromide (PHB), a volume of toluene equal to volume of THF already present in the polymer solution is added to the polymer solution to provide a modified polymer solution. The modified polymer solution is washed with an amount of aqueous sodium hydrogen sulfite solution sufficient to neutralize or quench unreacted PTB that may be present in the modified polymer solution, thereby simultaneously removing or eliminating orange color present in the modified polymer solution before the aqueous sodium hydrogen sulfite solution wash. Br-SBC is isolated from the modified solution by precipitation in methanol (a 5/1 volumetric ratio of methanol/polymer solution). The precipitated Br-SBC is recovered as in Comp Ex G-M. Table 4 below shows SBC source, % 1,2 isomer, % styrene block and type of block (diblock, triblock or random), Br-SBC $M_n$, Br-SBC $M_w$ and 5% WLT. The residual non-aromatic double bond content is less than 5 percent, based upon non-aromatic double bond content prior to bromination.

TABLE 4

| Ex No | SBC Source | % 1,2-isomer | % Styrene Block/Type | Br-SBC $M_n$ | Br-SBC $M_w$ | 5% WLT (° C.) |
|---|---|---|---|---|---|---|
| 1 | SBC-1 | 78 | 32/DB | 5600 | 5800 | 224 |
| 2 | SBC-2 | 75 | 31/DB | 36,000 | 37,300 | 228 |
| 3 | SBC-3 | 93 | 34/DB | 5200 | 5400 | 225 |
| 4 | SBC-4 | 92 | 34/DB | 20,600 | 21,600 | 233 |
| 5 | SBC-6 | 9 | 36/DB | 103,900 | 106,200 | 226 |
| 6 | SBC-7 | 10 | 29/TB | 92,400 | 97,800 | 241 |
| 7 | SBC-8 | 10 | 43/TB | 68,300 | 71,500 | 239 |
| 8 | SBC-5 | 72 | 37/DB | 52,300 | 56,000 | 238 |
| 9 | SBC-9 | 74 | 37/DB | 62,000 | 65,000 | 230 |
| 10 | SBC-10 | 76 | 36/TB | 53,000 | 55,000 | 240 |
| 11 | SBC-11 | 84 | 35/DB | 68,000 | 70,000 | 231 |
| 12 | SBC-12 | 81 | 41/TB | 75,000 | 78,000 | 245 |
| 13 | SBC-13 | 96 | 47/DB | 16,200 | 17,100 | 240 |
| 14 | SBC-14 | 90 | 62/DB | 15,500 | 16,200 | 237 |
| 15 | SBC-15 | 92 | 82/DB | 11,900 | 12,400 | 236 |
| 16 | SBC-17 | 37 | 60/DB | 20,100 | 21,800 | 218 |
| 17 | SBC-16 | 65 | 22/R | 143,000 | 183,000 | 229 |
| 18 | SBC-18 | 88 | 42/DB | 31,500 | 33,000 | 241 |
| 19 | SBC-19 | 43 | 43/TB | 76,000 | 80,200 | 239 |
| 20 | SBC-20 | 54 | 42/TB | 81,600 | 85,100 | 242 |
| 21 | SBC-21 | 80 | 35*/DB | 46,200 | 48,7000 | 228 |

*means that the styrenic monomer is para-methyl styrene

The data in Table 4 demonstrate that Br-SBC has good thermal stability as evidenced by a 5% WLT in excess of 200° C., with all of the Br-SBC's in Table 4 having a 5% WLT in excess of 215° C. (noted above as being even more preferable than 200° C.). In contrast to Br-PBDs, which lack desirable thermal stability at low (for example 9% as in Comp Ex D) 1,2 isomer content, Br-SBCs have acceptable thermal stability at that same 1,2 isomer content. In addition, triblock Br-SBCs tend to have better thermal stability than diblock Br-SBCs of a similar 1,2-isomer content as shown by Ex 6 and Ex 7 relative to Ex 5.

Neutron activation is used to analyze Comp Ex J and Ex 4 for bromine content. Comp Ex J has a theoretical maximum bromine content of 75% and an actual bromine content, measured as described above, of 71%. Ex 4 has a theoretical maximum bromine content of 66% and an actual bromine content of 63%. In each case, actual bromination is approximately 95% of theoretical maximum. This analysis, described by Grafton D. Chase & Joseph L. Rabinowitz in "Activation Analysis", *Principles of Radioisotope Methodology*, Chapter 12, Section 12.5, pages 427-432, Burgess Publishing Company (1967), simply confirms incorporation of bromine to near theoretical levels.

Neutron activation analysis involves placing a sample in a nuclear reactor where it is exposed to neutrons produced from fission of U-235. During irradiation, a portion of bromine atoms contained in the sample absorb a neutron and become radioactive. As radioactive bromine isotopes decay, gamma rays are emitted and may be detected using high purity germanium detectors. One may quantify bromine content by comparing the intensity of the gamma emissions at a characteristic energy to that of a known standard.

EX 22

Ex 9 is replicated, but the procedure is modified by halving the reaction time to 24 hours. This results in an increase in % unreacted double bonds from 2% to 9% and a concurrent increase in 5% WLT from 230° C. to 232° C. In other words, it appears that higher levels of unreacted double bonds leads to a slight improvement in thermal stability.

EX 23

An alternate procedure and apparatus are used to prepare a Br-SBC via homogeneous bromination with a carbon tetrachloride/butanol solvent mixture. Instead of the apparatus and procedure detailed above, 6 grams (g) of SBC-12 (0.067 mole of polybutadiene repeat unit) and 60 mL carbon tetrachloride ($CCl_4$) are added to a 250 mL 3-necked flask equipped with a mechanical stirrer and a thermocouple to prepare a stirred solution. After the stirred solution appears to be visually homogeneous, 22 milliliters (mL) of n-butanol are added with continued stirring (at a rate of 250 revolutions per minute (rpm)) to prepare a modified stirred solution that retains its visual homogeneous appearance. 10.3 g (0.065 mole) of bromine are added to the stirred solution (250 rpm) over 20 minutes to provide a stirred reaction mixture. The stirred reaction mixture, initially at room temperature (nominally 25° C.) evidences an exotherm during bromine addition, reaching a maximum temperature of 41° C. The reaction mixture is stirred for an additional 15 hours before 50 mL of a 20 wt % aqueous (aq.) sodium bisulfite solution (wt % being based on sodium bisulfite solution weight) is added. Stirring is continued for 10 minutes and then 50 mL of methylene chloride ($MeCl_2$) is added to the reaction mixture. Stirring is discontinued and the reaction mixture is transferred to a separatory funnel where it separates into an organic phase and an aqueous phase.

The organic phase is washed first with 50 mL of distilled water and then with 50 mL of saturated sodium chloride (aq.). Br-SBC is precipitated from the washed organic phase by adding the washed organic phase into a 5-fold excess (based on solution volume) of methanol. Br-SBC is isolated by filtration and dried overnight in-vacuo at 80° C. to yield 13.7 g (84% isolated yield) of Br-SBC. $^1$H NMR of the Br-SBC shows 2.4% unreacted double bonds and TGA analysis shows a 5% WLT of 239° C.

COMP EX N

Using the same apparatus as in Ex 23 and a modification of the process of Ex 23, a Br-SBC is prepared by a heterogeneous bromination process. Instead of 60 mL of $CCl_4$, only 11.3 mL of $CCl_4$ is added. The solution appears to be visually non-homogeneous before and after adding n-butanol. The amount of bromine is reduced to 9 g (0.056 mole) and it is added over a period of 60 minutes instead of the 20 minutes in Ex 23. The maximum temperature during bromine addition is the same as in Ex 23. Recovery of Br-SBC as in Ex 23 yields 8.5 grams (57% isolated yield) of Br-SBC. $^1$H NMR shows 54% unreacted double bonds and TGA analysis shows a 5% WLT of 247° C. In addition, the Br-SBC shows evidence of cross-linking during drying after polymer recovery.

COMP EX O

Ex 23 is replicated using 5 g of PB-9 rather than 6 g of SBC-12 and modifying the procedure as detailed below. A homogeneous polymer solution is prepared using 15.7 mL $CCl_4$ rather than 60 mL $CCl_4$ as in Ex 23. N-butanol addition is increased to 31 mL, while retaining a visually homogeneous solution. Bromine addition is increased to 12.5 g (0.078 mole) and the time of bromine addition is increased to 90 minutes, a procedure that results in a maximum temperature of 31° C. rather than 41° C. as in Ex 23. The time of stirring the stirred reaction mixture is increased to 16 hours and the amounts of sodium bisulfite solution and $MeCl_2$ are increased to 60 mL.

The recovery process is modified by washing the organic phase twice with 100 mL of distilled water and then twice with 100 mL of saturated sodium chloride (aq.). The brominated polymer is precipitated twice into a five-fold excess of methanol rather than once as in Ex 23 before drying the brominated polymer for 4 hours at 80° C. rather than overnight as in Ex 23 to yield 10.7 g (61% isolated yield) of Br-PBD. $^1$H NMR showed 41.5% unreacted double bonds and TGA analysis shows a 5% WLT of 225° C.

Ex 23 demonstrates that by understanding and optimizing reaction conditions to provide a homogeneous reaction medium, one can, by direct bromination using elemental bromine, make a Br-SBC that has thermal stability or 5% WLT comparable to a Br-SBC prepared by using PTB (for example Ex 12, Ex 14 or Ex 19) or another mild brominating agent. Comp Ex N and Comp Ex 0 show that bromination with elemental bromine in a heterogeneous reaction medium leads to a product with incomplete bromination (that is high levels of residual double bonds).

EX 24-27 AND COMP EX P-R

Thermal Stability of Blends of Bromine Sources with Polystyrene

Blends of different Br-SBCs with general purpose polystyrene (GPPS) resin (STYRON™™ 168, The Dow Chemical Company) are prepared and subjected, each of which has a bromine content of 2 wt %, based upon blend weight, to isothermal thermogravimetric analysis (TGA) at 200° C. Table 5 below summarizes Br-SBC, % 1,2 isomer, % styrene, type of SBC (diblock or triblock), time to onset of degradation and time to maximum rate of weight loss for samples subjected to TGA at 200° C. From a TGA plot, the time at which when rapid weight loss starts is determined and designated as "time to onset of degradation". Using a derivative of the same plot, the "time to maximum rate of weight loss" is designated as that time corresponding to where a curve representing the derivative reaches its maximum value.

TABLE 5

| Ex/Comp Ex | Br-SBC | % 1,2 | % Styrene Block/Type | Time to Onset of Degradation (min) | Time to Maximum Rate of Weight Loss (min) |
|---|---|---|---|---|---|
| P | Ex 5 | 9 | 36/DB | 0 | 1.3 |
| Q | Ex 6 | 10 | 29/TB | 0 | 0.7 |
| R | Ex 16 | 37 | 60/DB | 7.4 | 9.0 |
| 24 | Ex 4 | 92 | 34/DB | 42.5 | 52.6 |
| 25 | Ex 18 | 88 | 42/DB | 43.1 | 52.9 |
| 26 | Ex 8 | 72 | 37/DB | 20.5 | 25.7 |
| 27 | Ex 9 | 74 | 37/DB | 19.7 | 26.7 |

The data in Table 5 show that greater than 50% 1,2 content is preferred for thermal stability of blends of brominated copolymers with polystyrene.

EX 28-50 AND COMP EX S-AC

Flammability Testing of Molded Blends

Blends of different amounts of certain Br-SBCs with the same GPPS as in Ex 24 above or with SAN-1 resin (30 wt % acrylonitrile SAN copolymer resin commercially available from Dow under the trade designation TYRIL™ 125) or SAN-2 resin (an experimental SAN resin having an acrylonitrile content of 15.8 wt %, based upon total SAN copolymer weight, a molecular weight of 118,000 and a polydispersity of 2.2) are prepared and subjected to LOI and FP-7 testing. Ex 36-50 differ from Ex 28-35 in that they contain 0.5 wt %, based upon blend weight, of THERMCHEK™ 832, commercially available from Ferro Corporation, as a stabilizer. Test results together with bromine source, wt % bromine source (based on blend weight), wt % blend bromine content (based upon blend weight) are summarized in Table 6 below.

TABLE 6

| Ex/Comp Ex | Bromine Source (HBCD or Ex No) | Blend Polymer | Bromine Source Content (wt %) | % Br in blend | LOI (%) | FP-7 (s) |
|---|---|---|---|---|---|---|
| S | None | GPPS | 0 | 0 | 18.0 | N/A |
| T | HBCD | GPPS | 1 | 0.8 | 27.2 | 3.4 |
| U | HBCD | GPPS | 2.5 | 1.9 | 26.8 | 2.2 |
| V | G | GPPS | 1 | 0.7 | 25 | 2.5 |
| W | G | GPPS | 2.5 | 1.8 | 24.7 | 2.2 |
| X | H | GPPS | 1 | 0.7 | 26 | 2.5 |
| Y | H | GPPS | 2.5 | 1.8 | 26 | 2.1 |
| Z | I | GPPS | 1 | 0.7 | 25.7 | 3.3 |
| AA | I | GPPS | 2.5 | 1.8 | 27 | 2.2 |
| AB | J | GPPS | 1 | 0.7 | 27 | 2.4 |
| AC | J | GPPS | 2.5 | 1.8 | 27 | 0.7 |
| 28 | 1 | GPPS | 1.5 | 0.9 | 22.7 | 2 |
| 29 | 1 | GPPS | 4 | 2.5 | 25.7 | 1.1 |
| 30 | 2 | GPPS | 1.5 | 0.9 | 23.3 | 2.6 |
| 31 | 2 | GPPS | 4 | 2.5 | 23.6 | 0.8 |
| 32 | 3 | GPPS | 1.5 | 0.9 | 26.2 | 2.3 |
| 33 | 3 | GPPS | 4 | 2.5 | 26.2 | 1.1 |
| 34 | 4 | GPPS | 1.5 | 0.9 | 26.2 | 3.1 |
| 35 | 4 | GPPS | 4 | 2.5 | 26.2 | 1.6 |
| 36 | 8 | GPPS | 3.2 | 2 | 24.8 | 0.5 |
| 37 | 8 | SAN 1 | 3.2 | 2 | 24.5 | 0.3 |
| 38 | 8 | SAN 2 | 3.2 | 2 | 27.5 | 0.5 |
| 39 | 9 | GPPS | 3.2 | 2 | 25.3 | 0.8 |
| 40 | 9 | SAN 2 | 3.2 | 2 | 28 | 1.6 |
| 41 | 10 | GPPS | 3.2 | 2 | 24.5 | 0.3 |
| 42 | 11 | GPPS | 3.2 | 2 | 24.3 | 0.2 |
| 43 | 11 | SAN 2 | 3.2 | 2 | 25.0 | 0.4 |
| 44 | 12 | GPPS | 3.3 | 2 | 24.0 | 0.2 |
| 45 | 12 | SAN 2 | 3.3 | 2 | 25.0 | 0.4 |
| 46 | 13 | GPPS | 1.4 | 0.8 | 22.5 | 2.0 |
| 47 | 13 | GPPS | 3.2 | 1.9 | 24.3 | 0.3 |
| 48 | 15 | GPPS | 5.7 | 1.9 | 24.0 | 1.7 |
| 49 | 17 | GPPS | 3.0 | 2.0 | 23.7 | 0.2 |
| 50 | 17 | SAN 2 | 3.0 | 2.0 | 26.0 | 0.4 |

The data presented in Table 6 demonstrate that blends of a vinyl aromatic polymer, either GPPS or a SAN and Br-PBD or Br-SBC have flammability performance indicators (LOI and PP-7) comparable to those of blends of GPPS with HBCD (Comp Ex T and Comp Ex U). The data show that brominated copolymers and brominated homopolymers have utility as flame retardants for styrenic polymers. The data also show that the presence of a stabilizer does not adversely affect flammability performance of the blends. The flammability performance data in particular suggest that the brominated copolymers have adequate dispersion in GPPS or SAN, both of which are used as matrix polymers in the Examples shown in Table 6. Skilled artisans recognize that various techniques such as transmission electron microscopy may be used to validate dispersion of the brominated copolymer in the matrix polymer should such validation be desired.

EX 51-56 AND COMP EX AD-AH

Properties of Foams Made with Bromine Sources

Using the foam preparation procedure detailed above, a series of vinyl aromatic polymer foams based upon blends of either the same GPPS as in Table 6 or SAN-2 (also shown in Table 6) with a bromine source (HBCD, a Comp Ex or an Ex) are prepared, as shown in Table 7 below.

The foams are evaluated for LOI, FP-7 performance and density. Results of the evaluation are summarized in Table 7 below.

TABLE 7

| Ex/Comp Ex | BrPBD Ex | GPPS or SAN | % Br in foam | LOI (%) | FP-7 (s) | Foam Density (kg/m$^3$) |
|---|---|---|---|---|---|---|
| AD | HBCD | GPPS | 2.0 | 28.5 | 0.2 | 41.4 |
| AE | HBCD | GPPS | 2.0 | 28.0 | 0.1 | 40.4 |
| AF | HBCD | SAN 2 | 1.8 | 30.0 | 0.8 | 34.7 |
| AG | Comp Ex K | GPPS | 0.8 | 27.5 | 4.7 | 39.2 |
| AH | Comp Ex K | GPPS | 2.0 | 29.0 | 0.6 | 37.7 |
| 51 | Ex 13 | GPPS | 0.8 | 27.5 | 2.7 | 38.2 |
| 52 | Ex 13 | GPPS | 2.0 | 31.5 | 0.2 | 39.2 |
| 53 | Ex 9 | GPPS | 0.8 | 28.0 | 0.8 | 41.6 |
| 54 | Ex 9 | GPPS | 2.0 | 30.0 | 0.0 | 43.2 |
| 55 | Ex 9 | SAN 2 | 0.95 | 28.8 | 2.6 | 35.3 |
| 56 | Ex 9 | SAN 2 | 1.9 | 29.8 | 0.7 | 35.5 |

The data presented in Table 7 suggests that at equivalent bromine levels, brominated copolymers (for example Ex 52 and Ex 54) are at least as effective as HBCD (for example Comp Ex AD and Comp Ex AE), if not more so.

EX 57-64 AND COMP EX AI-AK

Properties of Extruded Polystyrene Foams with Bromine Sources

A series of extruded polystyrene foam materials is prepared using a larger scale apparatus equipped with a slit die (a two inch (5.1 centimeter (cm)) single screw extruder (equipped with a 25 kilowatt (kW) drive and a length to diameter ratio (L/D) of 26:1) than that used for Ex 51-56 and Comp Ex AD-AH. The extruder operates at the following set point temperatures: feed zone=135° C.; melt zone=175° C.; and mixing zone=200° C. Use of the larger scale apparatus requires certain modifications of the process used to make the foams of Ex 51-56 and Comp Ex AD-AH.

The feed rate of a blend of concentrate pellets and GPPS is increased to 60 kilograms per hour from the 2.3 kilogram per hour feed rate used in preparing the foams of Ex 51-56. The foaming agent used is as specified in Table 8 below (a combination of carbon dioxide, isobutane and, for some foams, water, rather than carbon dioxide, with or without water, as in Ex 51-56).

As foamable gel exits the slit die and enters a zone of lower pressure (atmospheric pressure), the gel expands into a foam that is preferably formed or shaped between parallel forming plates. If desired, similar results may be obtained using a die equipped with a die plate having defined therein multiple slits, multiple apertures or both rather than a slit die.

The polystyrene (PS) resin used to prepare the foams is a blend of two general purpose polystyrene (GPPS) resins (STYRON™ 640 and STYRON™ 680, The Dow Chemical Company) having a weight average molecular weight ($M_w$), as determined by size exclusion chromatography, of 158,000 grams per mole (g/mol). Each example or comparative example includes 100 parts by weight of the PS resin. Comp Ex AI-AK contain 2.5 pph of a compacted form of HBCD (SAYTEX™ HP-900G, commercially available from Albemarle Corp.) while Ex 57-64 contain varying amounts of the Br-SBC of Ex 11 or the Br-SBC of Ex 12 as shown in Table 8 below.

Ex 57-64 and Comp Ex AI-AJ contain varying amounts of carbon dioxide and isobutane as foaming agents as shown in Table 8. Comp Ex AK contains the amount of carbon dioxide and normal pentane (n-pentane) shown in Table 8. Ex 61-64 and Comp Ex AI also contain 0.25 pph of water as a co-foaming agent.

The foamable gel for each of Ex 57-64 and Comp Ex AI-AK contains the following additives: barium stearate in an amount of 0.15 parts by weight, per hundred parts by weight (pph) of GPPS resin; 0.2 pph of polyethylene (DOWLEX™ 2107, The Dow Chemical Company); 0.2 pph of copper blue phthalocyanine concentrate in polystyrene as a colorant; 0-0.15 pph of organotin stabilizer (THERMOLITE™ 400, Alkema Inc.); and 0.1 pph tetrasodium pyrophosphate. Comp Ex AI-AK contain no organotin stabilizer. Ex 57, Ex 58 and Ex 60-Ex 64 all contain 0.12 pph organotin stabilizer. Ex 59 contains 0.07 pph organotin stabilizer. In addition, Ex 59-60 and Comp Ex AK contain 0.1 pph of poly-1,4-diisopropylbenzene (CCPIB flakes, Degussa) as a flame retardant synergist.

Rather than neutron activation analysis as in determining bromine content of Ex 4, foam bromine content is determined using an Oxford Lab X1005 X-ray Fluorescence analyzer. A foam sample is submitted to x-ray radiation from a radioactive cadmium source. The x-ray radiation stimulates bromine contained in the sample and results in x-ray emissions that correspond to the bromine. Measuring intensity of x-rays emissions allows one to quantify bromine contained in the sample. Bromine content reported in Table 8 represents an average of measurements from three foam specimens.

Flammability performance is evaluated via standard tests as detailed below. France employs a test protocol designated M1, which measures performance according to French National Standard Test NF-P 92-5001/4/5. NF-P 92-5001/4/5 includes a test of flame persistence as indicated by average time lapse between flame initiation and flame self-extinguishment (SE), with a shorter time being better than a longer time, for 30 to 40 flame initiations. To pass this part of M1 test, no more than 10 percent of the flame initiations may have an extinguishment time greater than 2 seconds. Germany favors a test designated as B2 wherein flame height in centimeters (cm) is measured in accordance with Deutsches Institut für Normung (DIN) 4102. A flame height of less than 15 cm and no burning droplets from each of five foam specimens merits a pass rating according to B2 testing.

Vertical cell size in millimeters (mm) is determined as shown above, foam vertical compressive strength in kilopascals (kPa) is determined according to European Norm (EN)-826, foam density (kilograms per cubic meter (kg/m³)) in water is determined in accordance with International Standards Organization (ISO) 845-95 and, 30 days after foam preparation, foam thermal conductivity in (milliwatts per meter degree Kelvin at 10° C. (mW/m·K) is determined in accordance with EN 8301-91.

Table 8 summarizes the formulations, foam properties and fire test performance. One can see that the fire test performance of foams containing Br-SBC (Examples 54-61) are comparable, and in some cases, better than foams containing HBCD (samples AI-AK).

TABLE 8

| Composition or Property | Ex or Comp Ex | | | | | | | | | | |
|---|---|---|---|---|---|---|---|---|---|---|---|
| | 57 | 58 | 59 | 60 | 61 | 62 | 63 | 64 | AI | AJ | AK |
| pph HBCD | 0 | 0 | 0 | 0 | 0 | 0 | 0 | 0 | 2.5 | 2.5 | 2.5 |
| pph Br-SBC Ex 11 | 3.0 | 0 | 0 | 0 | 0 | 0 | 0 | 3.0 | 0 | 0 | 0 |
| pph Br-SBC Ex 12 | 0 | 3.0 | 1.8 | 3.0 | 3.0 | 3.0 | 3.0 | 0 | 0 | 0 | 0 |
| CO2 (pph) | 4.0 | 4.0 | 4.0 | 4.0 | 4.0 | 3.7 | 3.2 | 4 | 4 | 4.0 | 4.2 |
| Isobutane (pph) | 0.8 | 0.8 | 0.8 | 0.8 | 0.8 | 1.4 | 2 | 0.8 | 0.8 | 0.8 | 0 |
| n-pentane (pph) | 0 | 0 | 0 | 0 | 0 | 0 | 0 | 0 | 0 | 0 | 0.5 |
| Sample cross-section (cm²) | 3.9 | 4.0 | 3.8 | 3.7 | 3.1 | 3.6 | 3.1 | 4.2 | 4.5 | 4.6 | NM* |
| Vertical Cell Size, mm | 0.09 | 0.13 | 0.19 | 0.19 | 0.18 | 0.19 | 0.21 | 0.24 | 0.43 | 0.4 | NM |
| Vertical Compressive Strength (kPa) | 632 | 613 | 568 | 491 | 468 | 634 | 624 | NM | 432 | 382 | NM |
| Sample Density (kg/m³) | 41.4 | 41.9 | 41 | 39.1 | 39.9 | 40.3 | 39.5 | 38.9 | 35.8 | 36. | 36.4 |
| Foam Br content, (wt %) | 1.8 | 1.7 | 1.01 | 1.6 | 1.8 | 1.8 | 1.7 | 1.8 | 1.8 | 1.7 | 1.6 |
| B2 Flame height (cm) | 5.8 | 6 | 8 | 6.2 | 5.4 | 5.8 | 11 | NM | 6.2 | 6.4 | 6.9 |
| M1 Extinguishment time (sec) | 0.26 | 0.31 | 1.05 | 0.33 | 0.34 | 0.45 | 0.52 | 0.51 | 1.17 | 0.65 | 0.7 |
| M1 Percent extinguishment times greater than 2 seconds | 0 | 0 | 13 | 0 | 0 | 0 | 7 | 0 | 25 | 24 | 9 |
| Thermal conductivity, | NM | 32.2 | 32.7 | 32.5 | 31.9 | 32 | 30.5 | 32.8 | 32.6 | 32. | NM |

NM* means not measured

Ex 62 and Ex 63 are subjected to EN Fire Ignitability Test/ISO 11925-2 Class E to determine flame height in centimeters (cm). The flame height measurements of, respectively 6.3 cm and 5.8 cm, are less than 15 cm and merit a "Pass" rating under this test even though they have a flammable foaming agent (isobutane) content greater than 1 pph.

The data presented in Table 8 support several observations. First, Br-SBCs representative of the present invention yield acceptable foams relative to those produced using HBCD. Second, Br-SBCs of the present invention function as effective flame retardant additives in extruded polystyrene foams. Third, a comparison of Ex 57, Ex 58 and Comp Ex AJ shows that for similar Br content (1.8 wt % for Ex 57, 1.7 wt % for Ex 58 and 1.7 wt % for Comp Ex AJ), Br-SBC provides a much shorter M1 extinguishment time than HBCD for a similar B2 flame height.

EX 65-66 AND COMP EX AL

Flammability of Foams Made from Expandable Beads of Blends of Bromine Sources with Polystyrene For Ex 65, expandable polystyrene beads are prepared that contain a flame retarding amount of the Br-SBC of Ex 8 via suspension polymerization of styrene. Into a stirred polymerization reactor operating at ambient temperature (nominally 25° C.) during charging, are charged 721 g of water ($H_2O$), 3.1 g of tricalcium phosphate, 0.0775 g of calcium carbonate, 0.0078 g of $NaHSO_3$, and a styrene monomer solution containing 775 g of styrene monomer, 2.48 g of dibenzoyl peroxide, 1.162 g of tert-amylperoxy-2-ethylhexyl carbonate, 1.63 g of dicumyl peroxide, 0.217 g of divinyl benzene, 0.852 g of a polyethylene wax, and 5.81 g of the Br-SBC of Example 8. Styrene polymerization is initiated by heating reactor contents to a set point temperature of 90° C. Polymerization is allowed to continue at this temperature for a period of 4.5 hours before adding 22.4 g of a solution of 5% of polyvinyl alcohol in $H_2O$ as a suspension stabilizer, thereby providing a stirred suspension of polystyrene beads. The reactor is closed, and after 5 minutes 55.0 g of n-pentane is fed to the reactor. The reactor contents are heated to a set point temperature of 115° C. and n-pentane is allowed to impregnate the polystyrene beads for a period of 3 hours. The reactor contents are cooled to ambient temperature and, via filtration and centrifuge, the impregnated polystyrene beads are separated from the reactor contents. The separated beads are dried in air, thereby yielding expandable polystyrene beads that contain a flame retardant additive (Br-SBC of Ex 8) and have a narrow particle size distribution with an average particle size of 0.79 mm and a water content of 0.32 wt %, based on bead weight.

With two changes, the procedure used to prepare Ex 65 is replicated when preparing the expandable beads of Ex 66. One change involves decreasing the amount of tricalcium phosphate from 3.1 g to 2.48 g. The other change increases the amount of Br-SBC from 5.81 g to 7.05 g. The resulting expandable polystyrene beads have an average particle size of 0.83 mm and a water content of 0.3 wt %, based upon bead weight.

With one change, the procedure of Ex 65 is replicated to prepare expandable beads designated as Comp Ex AL. The change centers on substituting 4.7 g of HBCD for the stated amount of Br-SBC. The resulting expandable beads have an average particle size of 0.90 mm and a water content of 0.45 wt %, based upon bead weight.

Flame retardant behavior of the expandable beads of each of Ex 65, Ex 66 and Comp Ex AL is evaluated in accordance with test method DIN 4102. The beads are sieved and coated with 0.24 wt %, based on weight of beads, of a mixture of mono-, di- and tri-glycerides of higher fatty acids with a chain length of 8 to 22 carbon atoms ($C_8$ to $C_{22}$). The beads are pre-foamed by addition of steam at atmospheric pressure and dried for 24 hours at a temperature of 70° C. The dried and pre-foamed beads are converted into a molded bead foam article using a perforated block mold (50 cm by 25 cm by 25 cm) and, for final foaming, low pressure steam. The article is removed from the mold, cut into test specimens and stored at a temperature of 70° C. for a period of 24 hours before subjecting the test specimens to B2 flammability testing. The B2 average flame height in centimeters (cm) for Ex 65, Ex 66 and Comp Ex AL are, respectively, 7.8 cm, 7.2 cm and 5.8 cm. These data show that Br-SBCs of the present invention, such as that of Ex 8, provide desirable results when used as a flame retardant additive for expandable bead foams. Similar results are expected with other Br-SBCs that represent the present invention.

The invention claimed is:

1. A thermally stable brominated copolymer, the copolymer having polymerized therein a butadiene moiety and a vinyl aromatic monomer moiety, the copolymer having, prior to bromination, a vinyl aromatic monomer content of from 5 to 90 percent by weight, based upon copolymer weight, a 1,2-butadiene isomer content of greater than 0 percent by weight, based upon butadiene moiety weight, and a weight average molecular weight of at least 1000, the brominated copolymer having an unbrominated, non-aromatic double bond content of less than or equal to 15 percent, based upon non-aromatic double bond content of the copolymer prior to bromination as determined by $H^1$NMR spectroscopy and a five percent weight loss temperature, as determined by thermogravimetric analysis (TGA) of at least 200 degrees centigrade.

2. The brominated copolymer of claim 1, wherein the copolymer is selected from the group consisting of block copolymers, random copolymers and graft copolymers.

3. The brominated copolymer of claim 1, wherein the molecular weight of the copolymer prior to bromination is less than 200,000.

4. The brominated copolymer of claim 1, wherein the molecular weight of the copolymer prior to bromination is within a range of from 2,000 to 100,000.

5. The brominated copolymer of claim 1, wherein the molecular weight of the copolymer prior to bromination is within a range of from 50,000 to 100,000.

6. The brominated copolymer of claim 1, wherein the vinyl aromatic monomer is selected from the group consisting of styrene, alpha-methylstyrene, halogenated styrenes, alkoxylated styrenes, nitrated styrenes, alkylated styrenes, and mixtures thereof.

7. The brominated copolymer of claim 6, wherein the vinyl aromatic monomer is at least one of styrene, alpha-methylstyrene, 2-bromostyrene, 4-bromostyrene, 2-methoxystyrene, 4-methoxystyrene, 2-methylstyrene, 4-methylstyrene, 2,4-dimethylstyrene, 2-nitrostyrene and 4-nitrostyrene.

8. The brominated copolymer of claim 1, wherein the copolymer is a block copolymer selected from triblock copolymers and diblock copolymers.

9. The brominated copolymer of claim 1, wherein the 1,2-butadiene isomer content of the copolymer prior to bromination is greater than 10 percent by weight, based upon butadiene moiety weight.

10. The brominated copolymer of claim 9, wherein the 1,2-butadiene isomer content of the copolymer prior to bromination is greater than 50 percent by weight, based upon butadiene moiety weight.

11. The brominated copolymer of claim 9, wherein the 1,2-butadiene isomer content of the copolymer prior to bromination is greater than 70 percent by weight, based upon butadiene moiety weight.

12. The brominated copolymer of claim 9, wherein the 1,2-butadiene isomer content of the copolymer prior to bromination is greater than 90 percent by weight, based upon butadiene moiety weight.

13. The brominated copolymer of claim 1, wherein the 5% weight loss temperature is at least 205 degrees centigrade.

14. The brominated copolymer of claim 13, wherein the 5% weight loss temperature is at least 215 degrees centigrade.

15. The brominated copolymer of claim 13, wherein the 5% weight loss temperature is at least 225 degrees centigrade.

16. A polymer blend, the blend comprising a vinyl aromatic polymer and a flame-retarding amount of the brominated copolymer of claim 1.

17. The polymer blend of claim 16, wherein the vinyl aromatic polymer is at least one polymer selected from the group consisting of polystyrene, ethylene/styrene interpolymers, ethylene/propylene/styrene interpolymers, poly(alpha-methylstyrene), styrene/acrylonitrile copolymers, styrene/acrylic acid and esters, styrene/methacrylic acid and esters, and polymers having polymerized therein at least one moiety selected from styrene, 2-bromostyrene, 4-bromostyrene, 2-methoxystyrene, 4-methoxystyrene, 2-nitrostyrene, 4-nitrostyrene, 2-methylstyrene, 4-methylstyrene, and 2,4-dimethylstyrene.

18. The polymer blend of claim 16, wherein the flame retarding amount is an amount sufficient to provide the blend with a bromine content within a range of from 0.1 percent by weight to 25 percent by weight, based upon blend weight.

19. The polymer blend of claim 16, further comprising at least one additive selected from the group consisting of flame retardant additives, flame retardant adjuvants, thermal stabilizers, ultraviolet light stabilizers, nucleating agents, antioxidants, foaming agents, acid scavengers and coloring agents.

20. The polymer blend of claim 16, which is cellular.

21. The cellular polymer blend of claim 20, which is an extruded polymer foam or an expanded polymer bead foam.

22. A process of preparing the brominated copolymer of claim 1, the process comprising:
   a. providing a homogeneous reaction solution of a copolymer, a brominating agent and a solvent, the copolymer having polymerized therein a butadiene moiety and a vinyl aromatic monomer moiety, the copolymer having a vinyl aromatic monomer content of from 5 to 90 percent by weight, based upon copolymer weight, a 1,2-butadiene isomer content of greater than 0 percent by weight, based upon butadiene moiety weight, and a weight average molecular weight of at least 1000;
   b. maintaining the reaction solution under reaction conditions for a period of time sufficient to brominate at least 85 percent of non-aromatic double bonds contained in the copolymer, based upon non-aromatic double bond content of the copolymer prior to bromination as determined by $H^1$ NMR spectroscopy.

23. The process of claim 22, wherein the brominating agent comprises pyridinium tribromide.

24. The process of claim 22, wherein the solvent is selected from tetrahydrofuran or a blend of carbon tetrachloride and an alcohol.

25. The process of claim 24, wherein the solvent is a blend of carbon tetrachloride and an alcohol and the brominating agent is elemental bromine.

* * * * *